US009341713B2

(12) United States Patent
Lyuh et al.

(10) Patent No.: US 9,341,713 B2
(45) Date of Patent: May 17, 2016

(54) SENSING CIRCUIT FOR RECOGNIZING MOVEMENT AND MOVEMENT RECOGNIZING METHOD THEREOF (71) Applicant: Electronics and Telecommunications Research Institute, Daejeon (KR)

(72) Inventors: Chun-Gi Lyuh, Daejeon (KR); Jung Hee Suk, Daejeon (KR); Young-deuk Jeon, Daejeon (KR); Tae Moon Roh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 118 days.

(21) Appl. No.: 14/454,603

(22) Filed: Aug. 7, 2014

(65) Prior Publication Data
US 2015/0260846 A1    Sep. 17, 2015

(30) Foreign Application Priority Data

Mar. 11, 2014    (KR) ........................ 10-2014-0028443

(51) Int. Cl.
*G01S 17/58*     (2006.01)
*G01S 17/00*     (2006.01)
*G01S 7/491*     (2006.01)

(52) U.S. Cl.
CPC .............. *G01S 17/58* (2013.01); *G01S 7/4912* (2013.01); *G01S 17/003* (2013.01)

(58) Field of Classification Search
CPC ..... G01S 17/58; G01S 17/003; G01S 7/4813; G01S 7/4912

USPC ....................................................... 250/206.1
See application file for complete search history.

(56) References Cited

U.S. PATENT DOCUMENTS

| 8,294,105 | B2 | 10/2012 | Alameh et al. | |
| 2008/0006762 | A1* | 1/2008 | Fadell | G01J 1/4204 250/201.1 |
| 2008/0266083 | A1* | 10/2008 | Midholt | G06F 3/017 340/540 |
| 2008/0309641 | A1* | 12/2008 | Harel | G06F 3/0418 345/173 |
| 2009/0158203 | A1* | 6/2009 | Kerr | G06F 3/017 715/784 |
| 2010/0141773 | A1 | 6/2010 | Jang et al. | |

FOREIGN PATENT DOCUMENTS

KR    10-2013-0021248 A    3/2013
KR    10-1304096 B1    9/2013

* cited by examiner

Primary Examiner — Seung C Sohn (57) ABSTRACT

Provided is a sensing circuit for recognizing a movement including: at least one light emitting device outputting light; at least one light receiving device receiving the light reflected by an object on the light emitting device and generating a plurality of current signals proportional to an amount of incident light; a signal conversion unit converting the plurality of current signals into a plurality of digital signals; a recognition unit measuring a synthetic digital signal to determine whether an object moves by receiving the plurality of current signals; and a control unit controlling the recognition unit, wherein the recognition unit generates a clock signal for the synthetic digital signal greater than a critical value and measures a count generated by the clock signal; and the control unit determines whether the object moves through a comparison of the count and a reference value.

12 Claims, 13 Drawing Sheets

SENSING CIRCUIT FOR RECOGNIZING MOVEMENT AND MOVEMENT RECOGNIZING METHOD THEREOF

CROSS-REFERENCE TO RELATED APPLICATIONS

This U.S. non-provisional patent application claims priority under 35 U.S.C. §119 of Korean Patent Application No. 10-2014-0028443, filed on Mar. 11, 2014, the entire contents of which are hereby incorporated by reference.

BACKGROUND OF THE INVENTION

The present invention disclosed herein relates to an electronic recognition device, and more particularly, to a movement recognizing method of a sensing circuit for recognizing a movement of an object maintained for more than a predetermined time.

An electronic recognition device may include a sensing circuit for recognizing a movement. The sensing circuit recognizes an object as at least one light receiving device receives light (for example, infrared light) emitted from at least one light emitting device and reflected by an object. At least one light receiving device is classified as at least one first direction light receiving device disposed in a first direction and at least one second direction light receiving device disposed in a second direction. The first and second direction light receiving devices convert received light into current signals. The current signals are converted into digital signals by a signal conversion unit.

In order to recognize a direction in which an object moves, the sensing circuit calculates a difference value between first direction digital signals for the first direction light receiving devices and a difference value between second direction digital signals for the second direction light receiving devices. The difference values of the first and second direction digital signals may be expressed as graphs, respectively. A movement direction of an object is determined based on a slope at a zero crossing point of a graph. In more detail, it is determined that the object moves in the direction having a larger slope at a zero crossing point. Additionally, the sensing circuit calculates an average digital signal of digital signals and designates a critical value of the average digital signal. If the magnitude of the average digital signal is greater than the critical value, it is recognized that an object moves. If the magnitude of the average digital signal is less than the critical value, the movement recognizing process of an object is initialized.

The sensing circuit for recognizing such a movement does not reflect noise of a digital signal generated by a movement of an object. Accordingly, noise of a digital signal having a magnitude greater than a critical value is determined as a signal generated from a movement of an object. Due to this, the recognition rate of a sensing circuit is deteriorated. If a filter is used to remove noise of a digital signal, a delay time occurs until the magnitude of a signal is reflected to a result. Accordingly, the fast movement recognition of the sensing circuit is unavailable.

SUMMARY OF THE INVENTION

The present invention provides a sensing circuit sensing a movement of an object with the reduced influence of noise and a movement recognizing method thereof.

Embodiments of the present invention provide sensing circuits for recognizing a movement including: at least one light emitting device outputting light; at least one light receiving device receiving the light reflected by an object on the light emitting device and generating a plurality of current signals proportional to an amount of incident light; a signal conversion unit converting the plurality of current signals into a plurality of digital signals; a recognition unit measuring a synthetic digital signal to determine whether an object moves by receiving the plurality of current signals; and a control unit controlling the recognition unit, wherein the recognition unit generates a clock signal for the synthetic digital signal greater than a critical value and measures a count generated by the clock signal; and the control unit determines whether the object moves through a comparison of the count and a reference value.

In some embodiments, the recognition unit may include: a signal detection unit measuring the magnitudes of the plurality of digital signals at a predetermined time interval; a synthetic signal detection unit measuring the magnitude of the synthetic digital signal, which is the sum of the magnitudes of the plurality of digital signals, at a predetermined time interval, and if the magnitude of the synthetic digital signal is greater than the critical value, outputting the clock signal; a counter measuring the count increased by an input of the clock signal; and a direction determination unit determining a movement direction of the object on the basis of a difference value between the plurality of digital signals.

In other embodiments, the direction determination unit may determine first and second direction movements of the object by obtaining a maximum value and a minimum value of the difference value between the plurality of digital signals.

In still other embodiments, when the magnitude of the synthetic digital signal is greater than the critical value, the control unit may perform a control to generate the clock signal from the synthetic signal detection unit and when the magnitude of the synthetic digital signal is not greater than the critical value, the control unit may perform a control not to generate the clock signal from the synthetic signal detection unit.

In even other embodiments, when the count is greater than the reference value, the control unit may determine that the object moves and when the count is not greater than the reference value, the control unit may determine that noise occurs, thereby determining whether the object moves.

In other embodiments of the present invention, movement recognizing methods of a sensing circuit include: calculating a magnitude of a synthetic digital signal for a plurality of digital signals; determining whether the magnitude of the synthetic digital signal is greater than a critical value; generating a clock signal for the magnitude of the synthetic digital signal greater than the critical value on the basis of a determination result; determining whether a count increased by the clock signal is greater than a reference value; and determining whether an object moves on the basis of the determination result and outputting a result.

In some embodiments, the methods may further include, when the magnitude of the synthetic digital signal is greater than the critical value, generating the clock signal and when the magnitude of the synthetic digital signal is not greater than the critical value, determining that there is no movement of the object and returning to converting a plurality of current signals received from at least one light receiving device into the plurality of digital signals until an output value of the synthetic digital signal becomes greater than the critical value.

In other embodiments, the methods may further include, when the count is greater than the reference value, determining that the object moves and when the count is not greater than the reference value, determining that noise occurs and initializing information on the count stored in a counter.

In still other embodiments of the present invention, movement recognizing methods of a sensing circuit include: calculating difference values between a plurality of digital signals; calculating and comparing a maximum value and a minimum value of the difference values; determining a movement direction of an object through the comparison; and determining whether to recognize another movement of the object or whether to terminate the movement recognition of the object after the determining of the movement direction of the object.

In some embodiments, the calculating of the difference values between the plurality of digital signals may include: calculating a first direction difference value of first direction digital signals generated proportional to first direction current signals outputted from at least one light receiving device disposed in a first direction; and calculating a second direction difference value of second direction digital signals generated proportional to second direction current signals outputted from at least one light receiving device disposed in a second direction.

In other embodiments, the comparing of the maximum value and the minimum value may include calculating a maximum value and a minimum value of the first direction difference value and calculating a maximum value and a minimum value of the second direction difference value.

In still other embodiments, a difference between a maximum value and a minimum value of the first direction difference value may be a first difference; a difference between a maximum value and a minimum value of the second direction difference value may be a second difference; and the determining of the movement direction of the object may include determining first and second direction movements of the object through a comparison of the first and second differences.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

The present invention may apply various modifications and thus have diverse embodiments. Therefore, specific embodiments are shown in the drawings and described in more detail. Thus, it is intended that the present invention covers the modifications and variations of this invention provided they come within the scope of the appended claims and their equivalents.

Like reference numerals refer to like elements throughout. Also, in the figures, the dimensions of layers and regions are exaggerated for clarity of illustration. Although terms like first and second may be used to describe various components, the components are not limited to the terms. These terms are used only to distinguish one component from other components. For example, a first component may be referred to as a second component and vice versa without being departing from the scope of the present invention. The terms of a singular form may include plural forms unless they have a clearly different meaning in the context.

The meaning of "include," "comprise," "including," or "comprising," specifies a property, a region, a fixed number, a step, a process, an element and/or a component but does not exclude other properties, regions, fixed numbers, steps, processes, elements and/or components.

Figure 1:
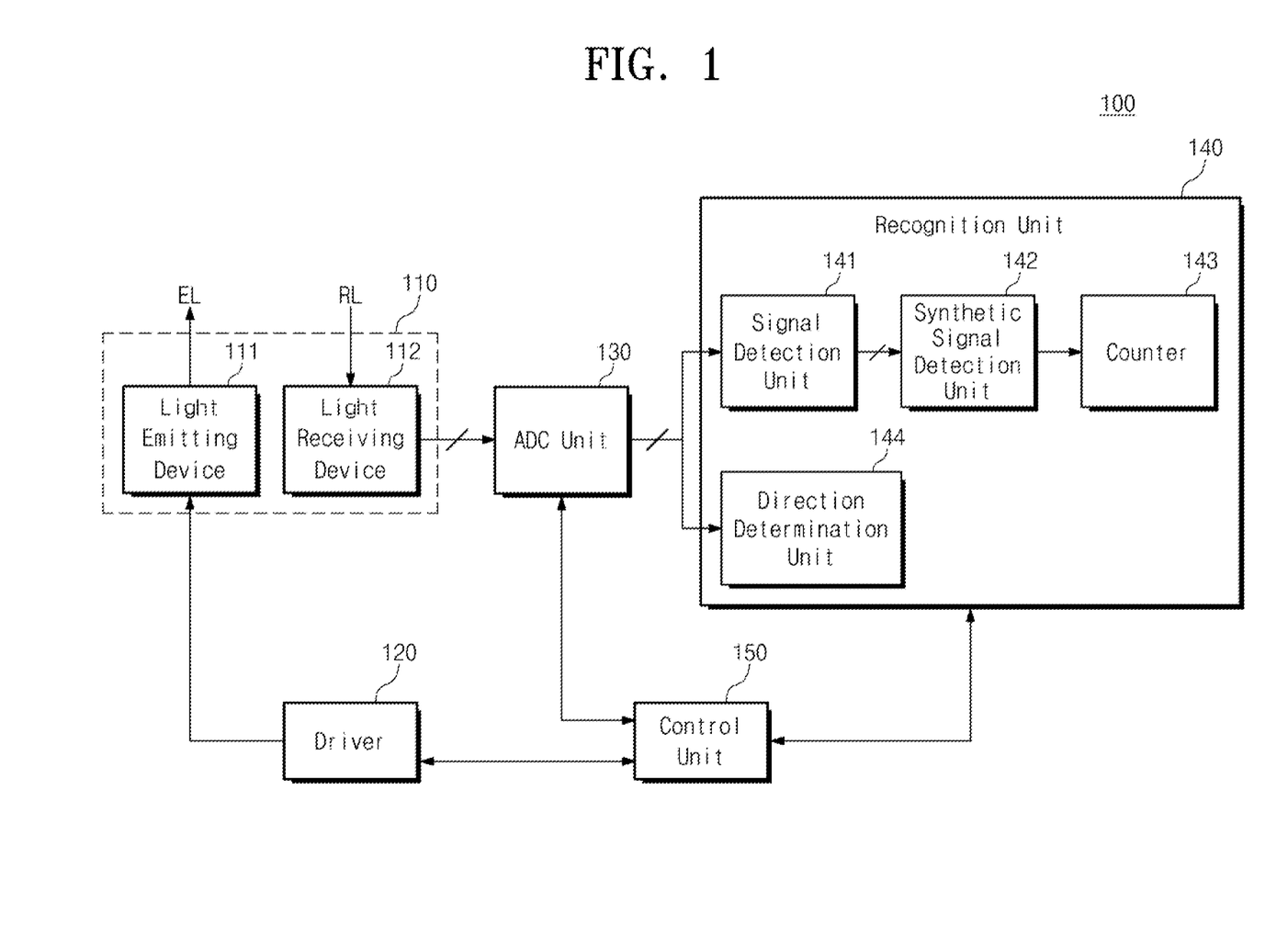
FIG. 1 is a block diagram of a sensing circuit for recognizing a movement of an object according to an embodiment of the present invention.

FIG. 1 is a block diagram of a sensing circuit for recognizing a movement of an object according to an embodiment of the present invention. The sensing circuit 100 of FIG. 1 includes a sensing unit 110, a driver 120, an analog digital converter (ADC) unit 130, a recognition unit 140, and a control unit 150. The sensing unit 110 includes a light emitting device 111 and a light receiving device 112. The recognition unit 140 includes a signal detection unit 141, a synthetic signal detection unit 142, a counter 143, and a direction determination unit 144.

The number of each of the light emitting device 111 and the light receiving device 112 is not limited to one. If necessary, the sensing unit 110 may include one light emitting device 111 and a plurality of light receiving devices 112. Additionally, the sensing unit 110 may include a plurality of light emitting devices 111 and one light receiving device 112. Additionally, the sensing unit 110 may include a plurality of light emitting devices 111 and a plurality of light receiving devices 112. The light emitting device 111 may emit light EL. The light emitting device 111 does not emit light always.

The driver 120 controls the emission of the light EL from the light emitting device 111. In more detail, the driver 120 allows the light emitting device 111 to emit the light EL for a plurality of sequential periods according to a movement of an object. When there is an object on the sensing unit 110, the light EL from the light emitting device 111 is reflected by an object. Each of at least one light receiving device 112 receives the reflected light RL. At least one light receiving device 112 generates a plurality of current signals corresponding to the reflected light RL. At least one light receiving device 112 outputs a plurality of current signals to the ADC unit 130.

The ADC unit 130 performs a function for converting an analog signal into a digital signal. In more detail, the ADC unit 130 converts a plurality of current signals inputted per unit time into a plurality of digital signals and then outputs the converted digital signals to the recognition unit 140. A plurality of digital signals are outputted to the signal detection unit 141 and the direction determination unit 144 in the recognition unit 140.

The signal detection unit 141 measures the magnitudes of a plurality of digital signals for each unit time. The signal detection unit 141 outputs the magnitudes of the plurality of digital signals per unit time to the synthetic signal detection unit 142.

The synthetic signal detection unit 142 measures the magnitudes of a synthetic digital signal per unit time. In more detail, the synthetic signal detection unit 142 measures the magnitude of a synthetic digital signal, which is the sum of the magnitudes of a plurality of digital signals. The synthetic signal detection unit 142 outputs a clock signal to the counter 143 when the magnitude of a synthetic digital signal is greater than a critical value.

The counter 143 increases a count by one each time a clock signal is received. The counter 143 determines a movement of an object when the count is greater than a reference value. Accordingly, a detection result is outputted. If the count of the counter 143 is less than the reference value, the counter 143 determines it as the increase of the count due to noise and is reset.

The direction determination unit 144 determines a movement direction of an object by receiving a plurality of digital signals. The direction determination unit 144 receives first direction digital signals generated in proportion to first direction current signals outputted from light receiving devices disposed in a first direction. The direction determination unit 144 calculates a first direction difference value between the first direction digital signals. The direction determination unit 144 receives second direction digital signals generated in proportion to second direction current signals outputted from light receiving devices disposed in a second direction. The direction determination unit 144 calculates a second direction difference value between the second direction digital signals. The direction determination unit 144 determines a movement direction of an object through a comparison between the first and second direction difference values.

The control unit 150 controls the driver 120, the ADC unit 130, and the recognition unit 140. The control unit 150 controls the driver 120 and the ADC unit 130 so as to generate an accurate signal. That is, the control unit 150 controls the driver 120 so as to accurately generate a control signal for the light emitting device 111. The control unit 150 controls the ADC unit 130 so as to accurately generate a plurality of digital signals. Additionally, critical value information on the magnitude of a synthetic digital signal is stored in the control unit 150. The control unit 150 performs a control to output a clock signal to the counter 143 when the magnitude of a synthetic digital signal in the synthetic signal detection unit 142 is greater than a critical value.

Additionally, reference value information on the count of the counter 143 is stored in the control unit 150. When the count of the counter 143 is greater than the reference value, the control unit 150 determines that an object moves. Accordingly, the control unit 150 controls the recognition unit 140 so as to output a determination result. When the count is less than the reference value, the control unit 150 determines it as noise. Accordingly, the control unit 150 initializes count information of the counter 143. Once the determination result is outputted completely, the control unit 150 initializes information on the first and second direction difference values generated from the direction determination unit 144. Once the determination result is outputted completely, the control unit 150 initializes count information of the counter 143.

The sensing circuit 100 of FIG. 1 may accurately distinguish noise from a movement of an object by the counter 143. Additionally, the direction determination unit 144 of the sensing circuit 100 improves the recognition rate of the sensing circuit 100 by distinguishing the first and second direction movements of an object.

Figure 2:
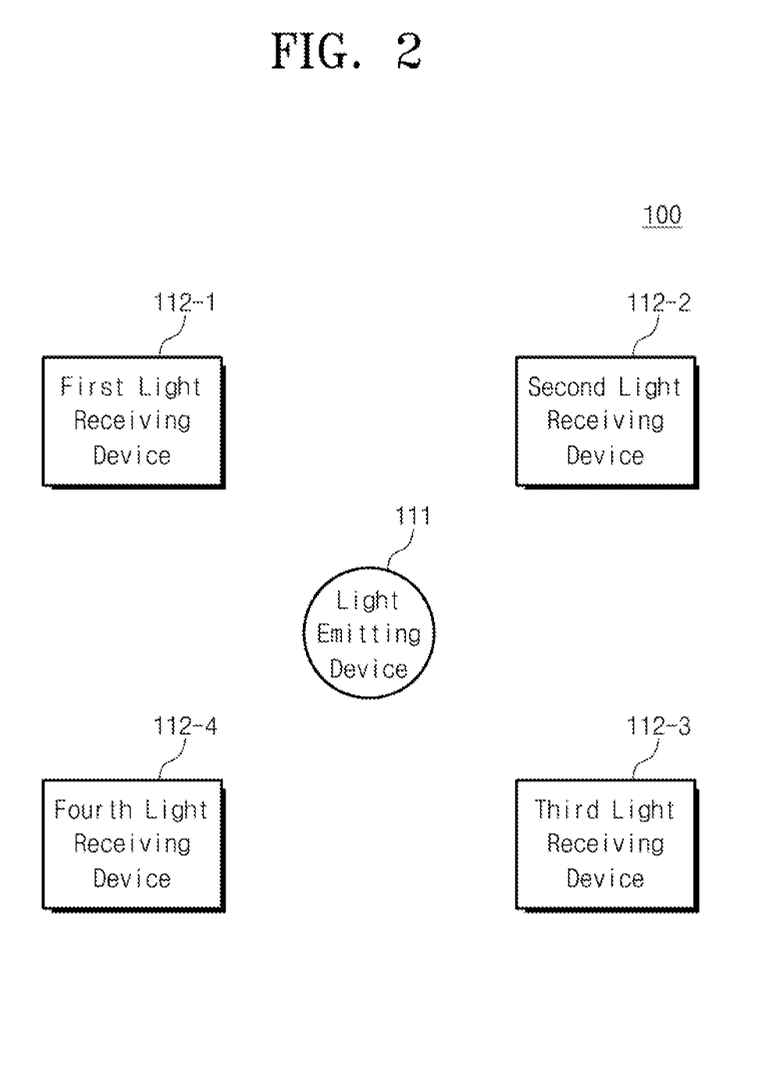
FIG. 2 is a block diagram when the sensing circuit of FIG. 1 includes four light receiving devices and one light emitting device.
Figure 3:
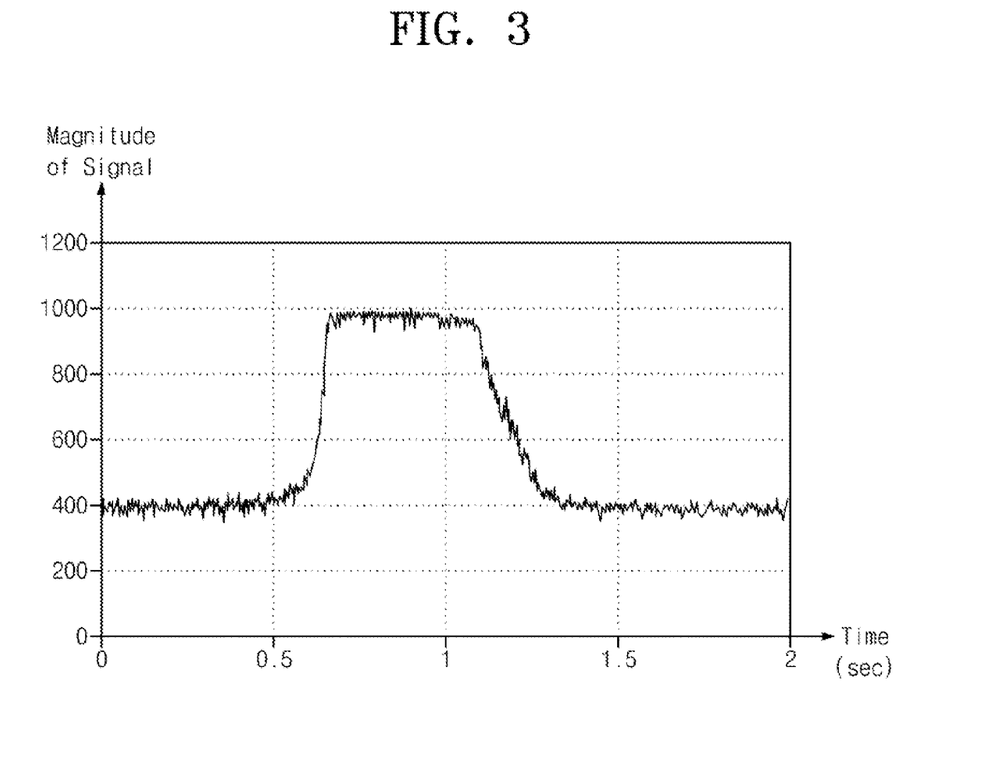
FIGS. 3 to 6 are graphs illustrating the magnitude of a digital signal per unit time proportional to a current signal outputted from at least one light receiving device according to an embodiment of the present invention.
Figure 4:
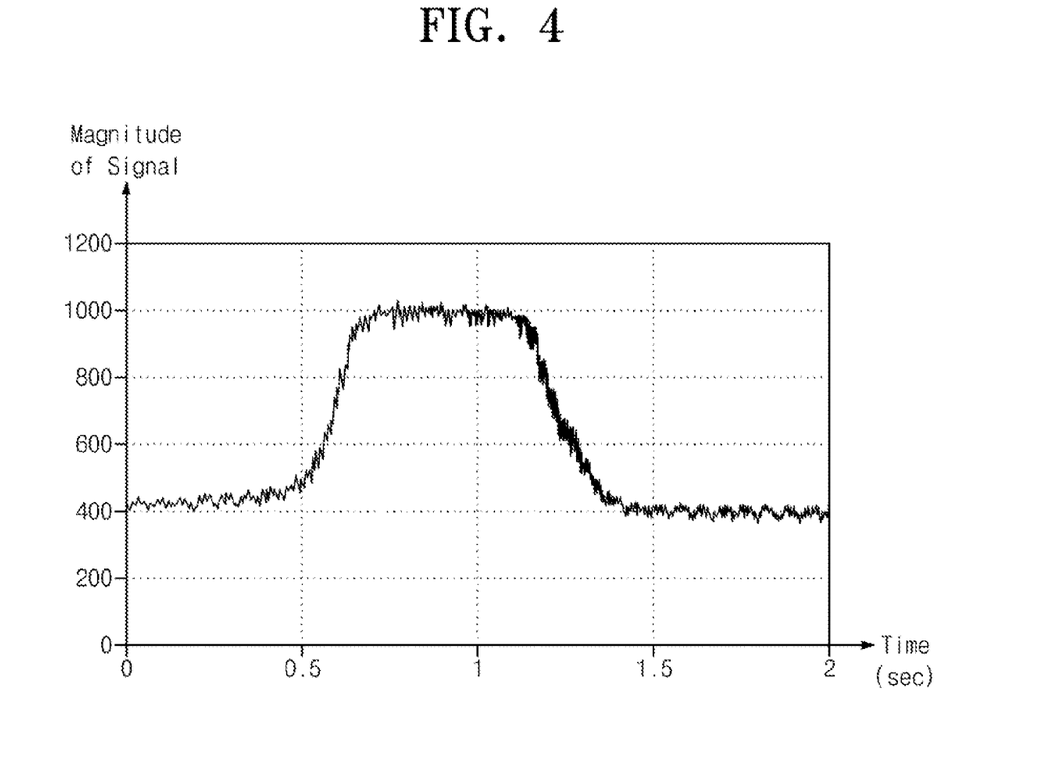
Figure 5:
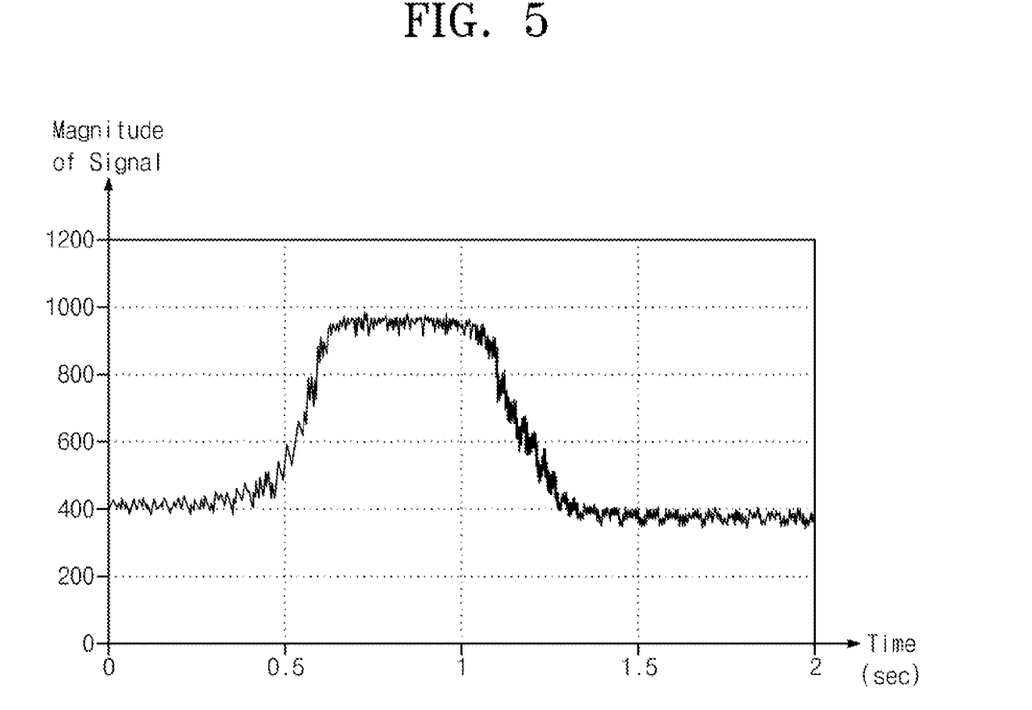
Figure 6:
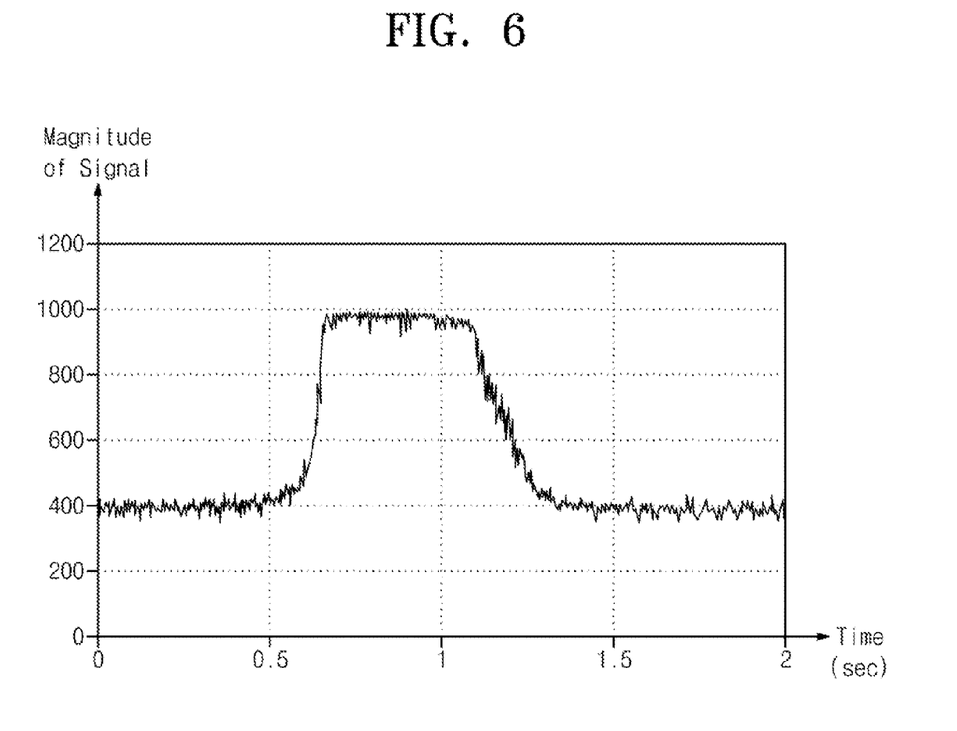

FIG. 2 is a block diagram when the sensing unit 100 of FIG. 1 includes four light receiving devices and one light emitting device. FIG. 2 is a block diagram illustrating an arrangement of a plurality of light receiving devices and one light emitting device in order for describing the present invention. The sensing unit 110 includes a light emitting device 111 and first to fourth light receiving devices 112-1, 112-2, 112-3, and 112-4.

The direction determination unit 144 of FIG. 1 calculates difference values between digital signals proportional to current signals outputted from the first to fourth light receiving devices 112-1, 112-2, 112-3, and 112-4. According to an embodiment of the present invention, a value obtained by subtracting the sum of digital signals proportional to current signals outputted from the first and fourth light receiving devices 112-1 and 112-4 from the sum of digital signals proportional to current signals outputted from the second and third light receiving devices 112-2 and 112-3 is a first direction (for example, a parallel direction) difference value. Additionally, a value obtained by subtracting the sum of digital signals proportional to current signals outputted from the first and second light receiving devices 112-1 and 112-2 from the sum of digital signals proportional to current signals outputted from the third and fourth light receiving devices 112-3 and 112-4 is a second direction (for example, a vertical direction) difference value. Through the first and second direction difference values, the direction determination unit 144 determines a movement direction of an object.

FIGS. 3 to 6 are graphs illustrating the magnitude of a digital signal per unit time proportional to a current signal outputted from at least one light receiving device according to an embodiment of the present invention. FIGS. 3 to 6 are graphs illustrating the magnitude of a digital signal per unit time detected from the signal detection unit 141 of FIG. 1. FIGS. 3 to 6 are graphs when a current signal outputted from the first to fourth light receiving devices 112-1, 112-2, 112-3, and 112-4 is converted into a digital signal and measured per unit time.

An x-axis of FIGS. 3 to 6 represents a time in sec at which a digital signal is measured. The signal detection unit 141 may measure a digital signal at an interval of 0.0004 sec. Accordingly, FIGS. 3 to 6 illustrate the magnitude of a digital signal measured at an interval of 0.0004 sec in the signal detection unit 141. A y-axis of FIGS. 3 to 6 represents the magnitude of a digital signal. The y-axis of FIGS. 3 to 6 is a magnitude obtained when a digital signal outputted in bit unit is converted into a decimal value. The ADC unit 130 of FIG. 1 converts a current signal into a 10-bit digital signal. In more detail, the ADC unit 130 converts a current signal into a 10-bit digital signal in a form of '0000000000' to '1111111111'. The ADC unit 130 outputs the converted digital signal to the signal detection unit 141. Accordingly, in order to help understanding the present invention, the y-axis of FIGS. 3 to 6 is a value obtained when a 10-bit digital signal is converted into a decimal number.

Figure 7:
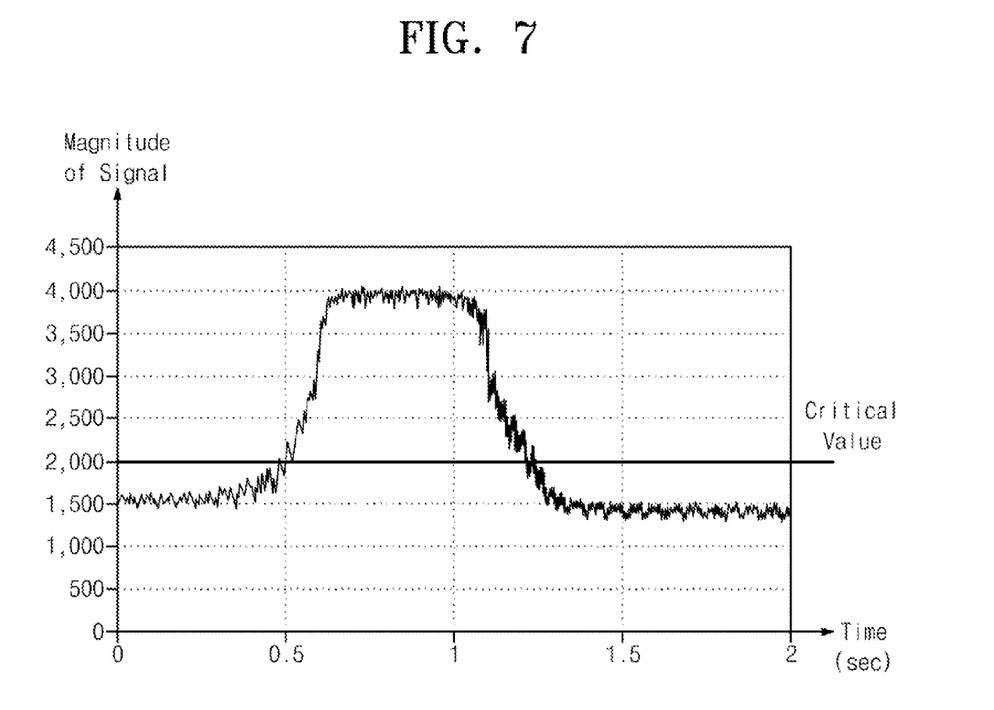
FIG. 7 is a graph illustrating the magnitude of a synthetic digital signal per unit time, which is obtained by synthesizing the magnitudes of a plurality of digital signals according to an embodiment of the present invention.

FIG. 7 is a graph illustrating the magnitude of a synthetic digital signal per unit time, which is obtained by synthesizing the magnitudes of a plurality of digital signals according to an embodiment of the present invention. The synthetic signal detection unit 142 of FIG. 1 receives the magnitudes of a plurality of digital signals per unit time from the signal detection unit 141 of FIG. 1. The synthetic signal detection unit 142 measures the magnitude of a synthetic digital signal per unit time by synthesizing a plurality of digital signals.

An x-axis of FIG. 7 represents a time in sec. The synthetic signal detection unit 142 may measure a synthetic digital signal at an interval of 0.0004 sec. Referring to FIG. 7, it is illustrated that a synthetic digital signal is measured at an interval of 0.0004 sec for 2 sec. This is used for describing the present invention. Accordingly, a signal measurement interval and a measurement period may vary. A y-axis of FIG. 7 represents the magnitude of a synthetic digital signal. The synthetic signal detection unit 142 receives a plurality of 10-bit digital signals from the signal detection unit 141. The synthetic signal detection unit 142 synthesizes a plurality of 10-bit digital signals. In order to help understanding the present invention, the y-axis of FIG. 7 is a value obtained when the synthesized 10-bit digital signal is converted into a decimal number.

Referring to FIG. 7, it is confirmed that the magnitude of a synthetic digital signal is drastically changed on the basis of a portion of '2000'. Accordingly, in order to describe the present invention, '2000', that is, the magnitude of a signal is designated as a critical value. The critical value is a reference for determining whether an object moves. If the magnitude of a synthetic digital signal is less than the critical value, it is confirmed that there is no object on the sensing unit 110 of FIG. 1. If the magnitude of a synthetic digital signal is greater than the critical value, it is confirmed that an object moves on the sensing unit 110. However, even when the magnitude of a synthetic digital signal is greater than the critical value, a signal may not be one generated by a movement of an object. This is called noise. Noise means a synthetic digital signal lasting more than a critical value and shorter than a reference time. If it is determined that noise occurring around a critical value is a synthetic digital signal generated by a movement of an object, the movement direction performance of a sensing circuit becomes deteriorated.

Figure 8:
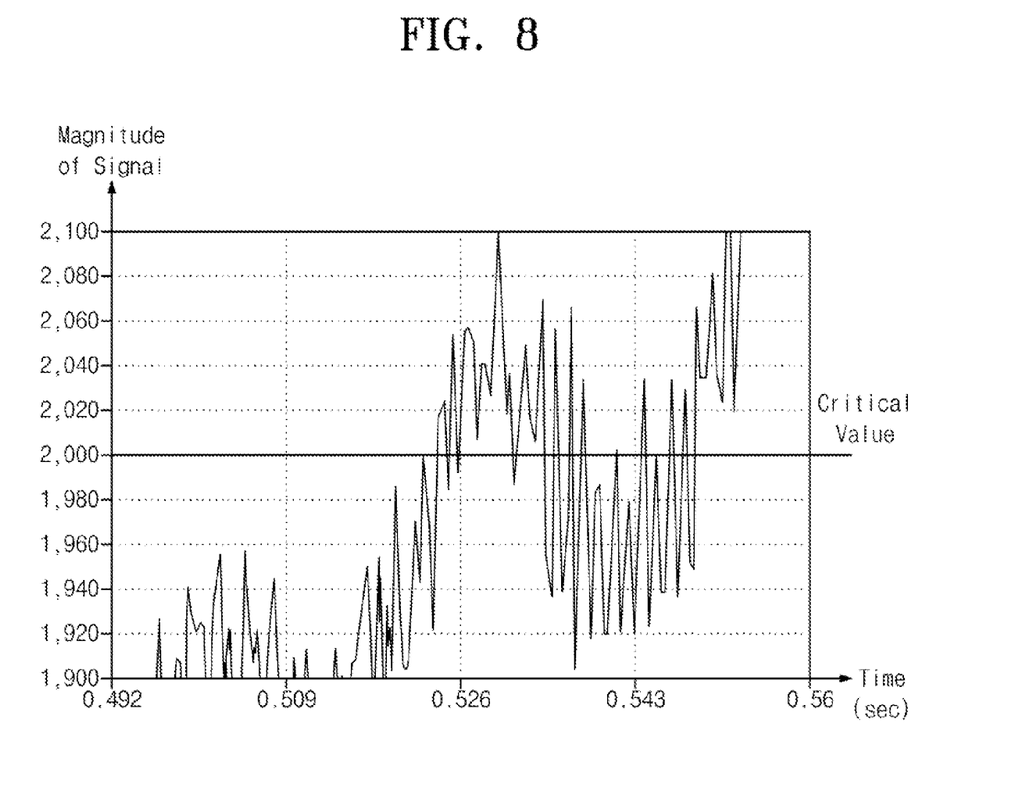
FIG. 8 is a graph illustrating the magnitude of a synthetic digital signal around a critical value according to an embodiment of the present invention.

FIG. 8 is a graph illustrating the magnitude of a synthetic digital signal around a critical value according to an embodiment of the present invention. FIG. 8 is a graph illustrating the enlarged magnitude of a synthetic digital signal around the critical value of FIG. 7 according to an embodiment of the present invention. Accordingly, an x-axis and a y-axis of FIG. 8 are similar to those of FIG. 7. The x-axis of FIG. 8 represents a time in sec at which a synthetic digital signal is measured around a critical value. Accordingly, FIG. 8 illustrates the magnitude of a synthetic digital signal measured from 0.492 sec to 0.56 sec. Referring to FIG. 8, the magnitude of a digital signal greater than a critical value occurs several times. This may be a synthetic digital signal by a movement of an object or may be noise. In order to improve the recognition rate of a sensing circuit, a reference for distinguishing synthetic digital signals generated by noise and a movement of an object is required.

Figure 9:
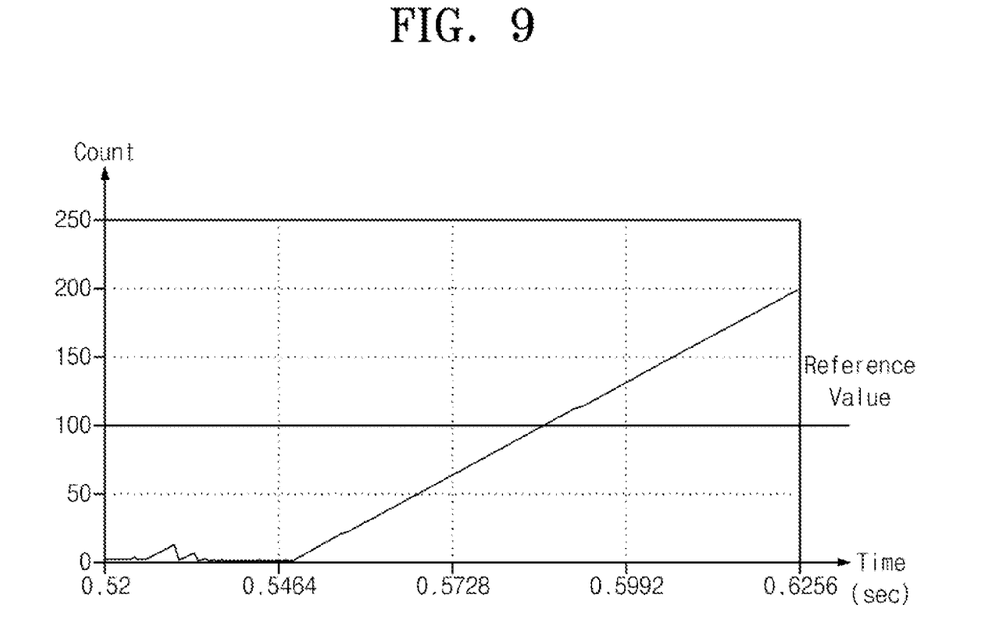
FIG. 9 is a graph illustrating a digital signal inputted to a counter according to an embodiment of the present invention.

FIG. 9 is a graph illustrating a digital signal inputted to a counter according to an embodiment of the present invention. Referring to FIG. 9, the synthetic signal detection unit 142 of FIG. 1 outputs a clock signal for a synthetic digital signal greater than a critical value. If the magnitude of a synthetic digital signal becomes less than a critical value, the synthetic signal detection unit 142 stops outputting a clock signal.

The clock signal is inputted to the counter 143 of FIG. 1. Each time a clock signal is inputted, the counter 143 increases a count by one. Accordingly, a y-axis of FIG. 9 represents a count of the counter 143 increased per unit time. An x-axis of FIG. 9 represents a time in sec at which the count is measured. FIG. 9 represents a count of the counter 143 increased from 0.52 sec to 0.6256 sec.

In order to help understanding the present invention, a reference value of a count is designated as '100'. Reference value information is stored in the control unit 150 of FIG. 1. The control unit 150 determines an interval where a count increased per unit time is not greater than '100' as noise. If a count increased per unit time is not greater than '100', the control unit 150 initializes the counter 143. After the counter 143 is initialized, if a clock signal is inputted, a count increases from '1' again. When a count increased per unit time is greater than '100', the control unit 150 determines that an object moves and performs a control to output a movement result.

Figure 10:
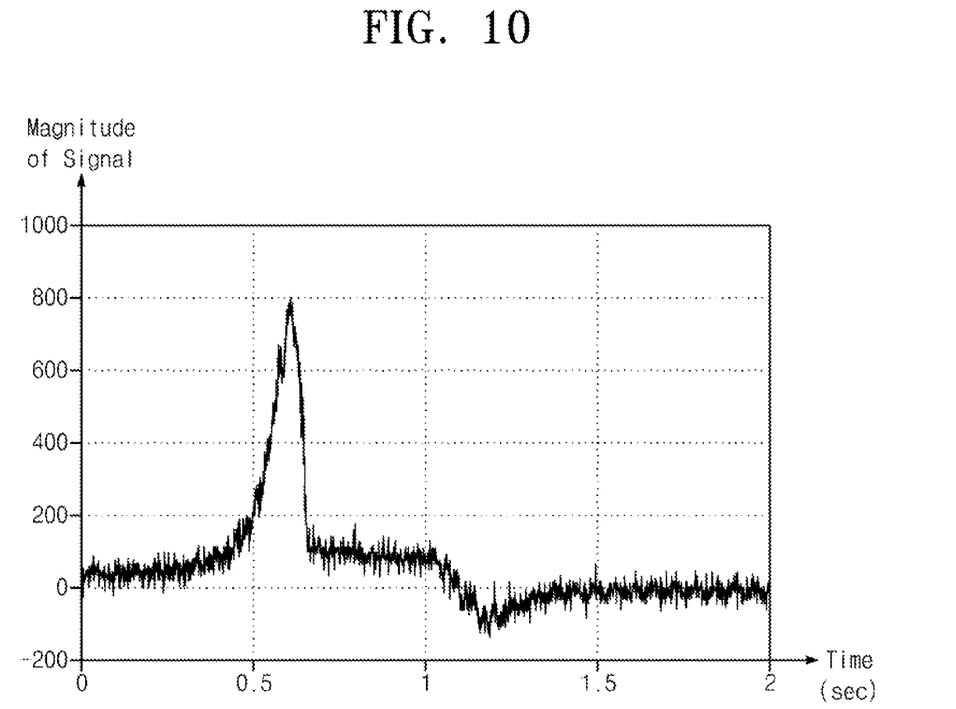
FIG. 10 is a graph illustrating a first direction difference value between first direction digital signals according to an embodiment of the present invention.

FIG. 10 is a graph illustrating a first direction difference value between first direction digital signals according to an embodiment of the present invention. Referring to FIG. 10, a first direction difference value is a value obtained by subtracting the sum of digital signals converted from current signals outputted from the second and third light receiving devices 112-2 and 112-3 of FIG. 2 from the sum of digital signals converted from current signals outputted from the first and fourth light receiving devices 112-1 and 112-4 of FIG. 2. Additionally, a difference between the maximum value and minimum value of the first direction difference value is referred to as a first difference.

An x-axis of FIG. 10 represents a time in sec at which a difference value between first digital signals is measured. The x-axis of FIG. 10 is similar to those of FIGS. 3 to 6 and thus its detailed description is omitted. A y-axis of FIG. 10 represents the size of a difference value between first digital signals. In order to help understanding the present invention, the y-axis of FIG. 10 represents a size obtained when the first direction difference value, that is a 10-bit digital signal, is converted into a decimal number. According to an embodiment of the present invention, the first direction means a horizontal direction. Referring to the graph of FIG. 10, the maximum value of the first direction difference value occurs before the minimum value. In consideration of this, it is determined that an object moves from the right to the left. If the minimum value occurs before the maximum value, it is determined that an object moves from the left to the right.

Figure 11:
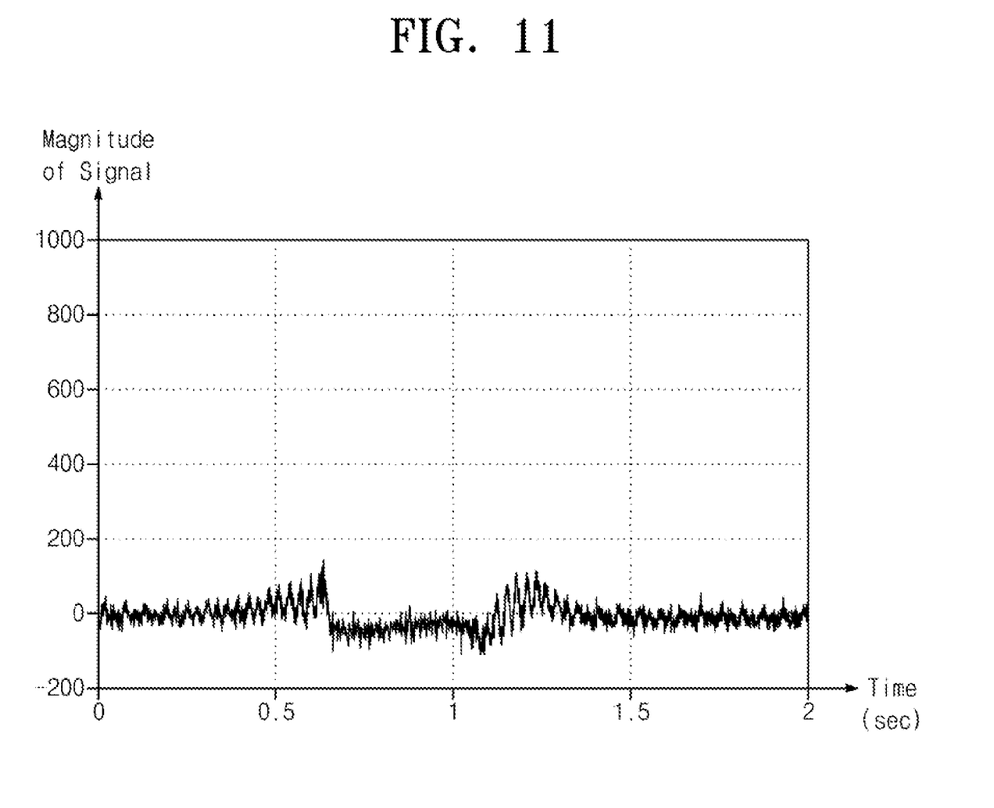
FIG. 11 is a graph illustrating a second direction difference value between second direction digital signals according to an embodiment of the present invention.

FIG. 11 is a graph illustrating a second direction difference value between second direction digital signals according to an embodiment of the present invention. An x-axis and a y-axis of FIG. 11 are similar to those of FIG. 10. Accordingly, detailed description for the x-axis and y-axis of FIG. 11 is omitted. A second direction difference value is a value obtained by subtracting the sum of digital signals proportional to current signals outputted from the first and second light receiving devices 112-1 and 112-2 of FIG. 2 from the sum of digital signals proportional to current signals outputted from the third and fourth light receiving devices 112-3 and 112-4 of FIG. 2. Additionally, a difference between the maximum value and minimum value of the second direction difference value is referred to as a second difference. According to an embodiment of the present invention, the second direction means a vertical direction.

Referring to FIGS. 10 and 11, the first difference is greater than the second difference. Accordingly, it is determined that an object moves in the first direction. If the difference between the maximum value and minimum value of FIG. 11 is greater than the difference between the maximum value and minimum value of FIG. 10, it is determined that an object moves in the second direction. Additionally, the occurrence order of the maximum value and minimum value of FIG. 11 becomes a reference for distinguishing a downward movement of an object from an upward movement of an object.

Figure 12:
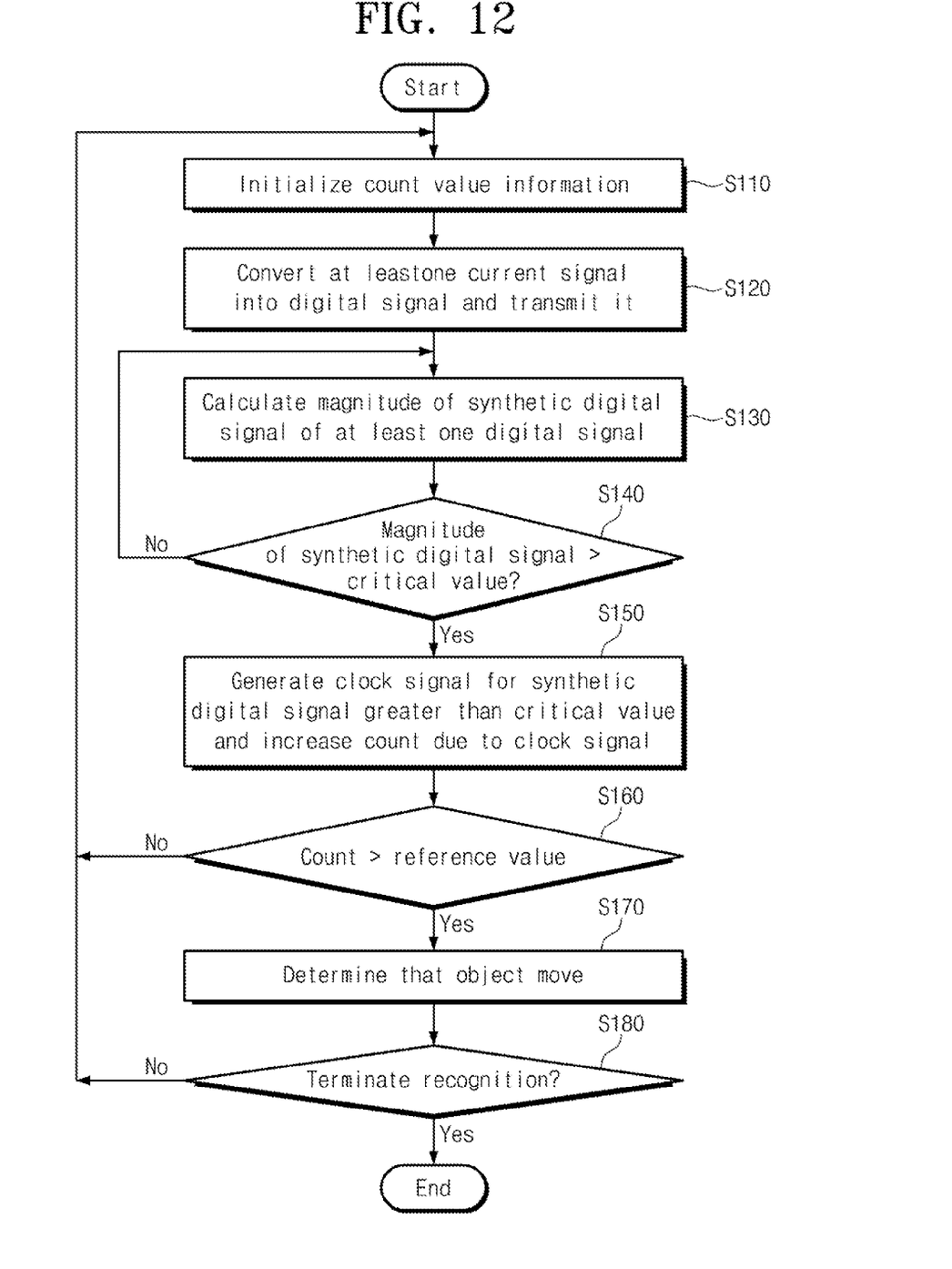
FIG. 12 is a flowchart illustrating an operation of a sensing circuit for recognizing whether an object moves according to an embodiment of the present invention.

FIG. 12 is a flowchart illustrating an operation of a sensing circuit for recognizing whether an object moves according to an embodiment of the present invention. In operation S110, a count value may be initialized. Before the sensing circuit 100 FIG. 1 recognizes a movement of an object, the control unit 150 of FIG. 1 initializes count value information stored in the counter 143 of FIG. 1. If the sensing circuit 100 does not recognizes a movement of an object before, operation S110 may be omitted.

In operation S120, a plurality of current signals are converted into a plurality of digital signals. The at least one light receiving device 112 of FIG. 1 outputs a plurality of current signals. The plurality of current signals are converted into a plurality of digital signals.

In operation S130, the magnitude of a synthetic digital signal obtained by synthesizing the plurality of digital signals is calculated. It is determined whether there is an object through the magnitude of the synthetic digital signal.

In operation S140, the magnitude and critical value of the synthetic digital signal are compared. If the magnitude of the synthetic digital signal is greater than the critical value, it is determined that there is an object on the sensing unit 100. Then, operation S150 is performed. If the magnitude of the synthetic digital signal is less than the critical value, it is determined that there is no object on the sensing unit 100. Accordingly, operation S130 is performed again.

In operation S150, a clock signal corresponding to the synthetic digital signal having the magnitude greater than the critical value is generated. If the magnitude of the synthetic digital signal is greater than the critical value, it is determined that there is an object on the sensing unit 110. Accordingly, the clock signal is inputted to the counter 143 and a count is increased proportional to the clock signal.

In operation S160, the count and a reference value are compared. If the count is greater than the reference value, operation S170 is performed. If the count is less than the reference value, it is determined that noise occurs. Accordingly, in order to initialize the count increased due to noise, operation S110 is performed again.

In operation S170, it is determined that an object moves because the count is greater than the reference value in operation S160. Accordingly, a determination result is outputted.

In operation S180, it is determined whether to terminate the movement recognizing process. If the sensing circuit 100 is a system capable of recognizing a repetitive movement, the movement recognition of an object is repeated again. If the sensing circuit 100 is a system incapable of recognizing a repetitive movement, the movement recognition of an object is terminated.

Referring to the flowchart of FIG. 12, through the comparing of the count and the reference value in operation S160, a signal generated by a movement of an object and a signal from noise are distinguished from each other accurately. Therefore, the recognition rate of the sensing circuit is improved.

Figure 13:
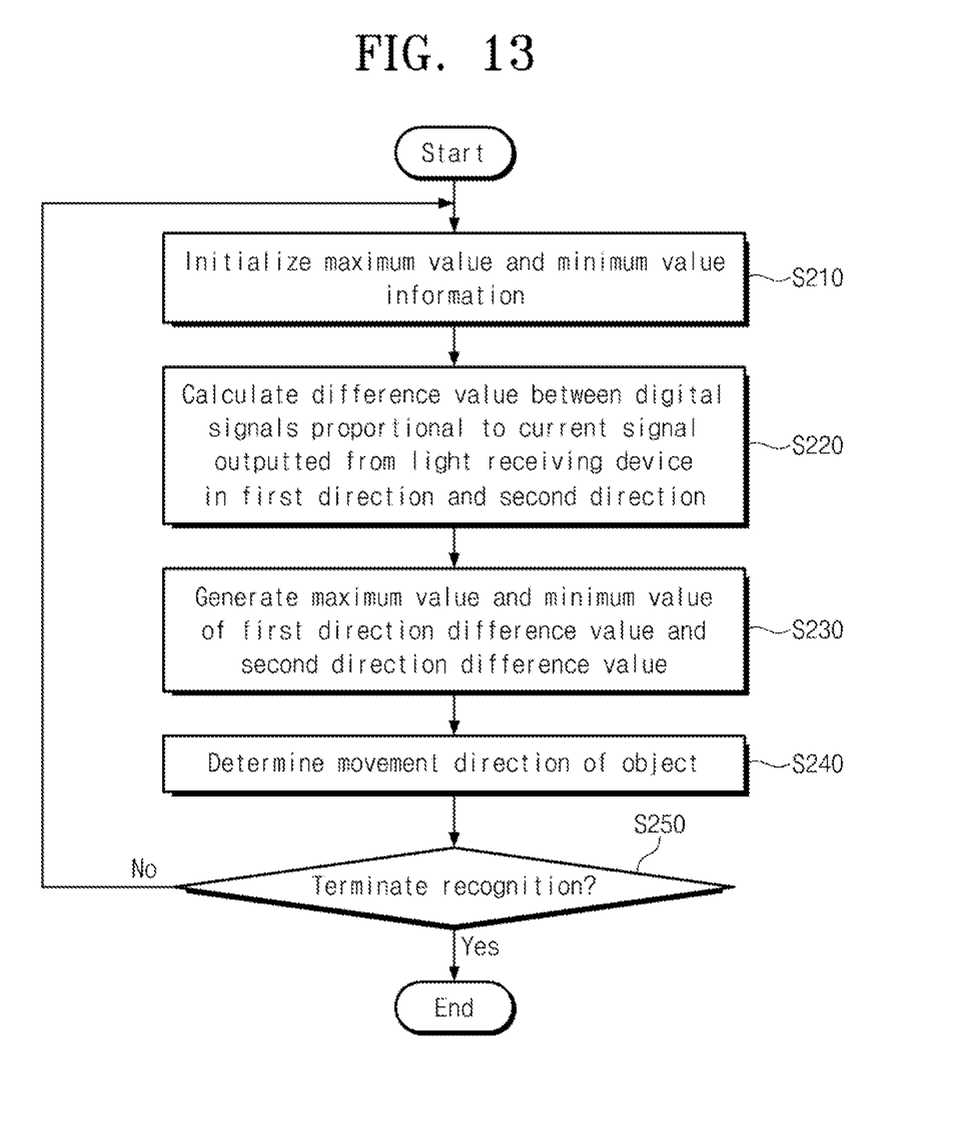
FIG. 13 is a flowchart illustrating an operation of a sensing circuit for recognizing a movement direction of an object according to an embodiment of the present invention.

FIG. 13 is a flowchart illustrating an operation of a sensing circuit for recognizing a movement direction of an object according to an embodiment of the present invention. In operation S210, before starting a process for recognizing a movement direction of an object, stored maximum value and minimum value information is initialized. If the sensing circuit 100 of FIG. 1 does not perform the movement recognition of an object, operation S210 may be omitted.

In operation S220, a difference value between a plurality of digital signals is calculated. A first difference value between first direction digital signals proportional to current signals outputted from light receiving devices disposed in a first direction is calculated. Then, a second difference value between second direction digital signals proportional to current signals outputted from light receiving devices disposed in a second direction is calculated.

In operation S230, the maximum value and minimum value of a first direction difference value is obtained and also the maximum value and minimum value of a second direction difference value is obtained. A first difference between the maximum value and the minimum value of the first direction difference value is compared to a second difference between the maximum value and the minimum value of the second direction difference value.

In operation S240, a movement direction of an object is determined. It is determined that an object moves in a direction having a larger difference among the first and second differences. Additionally, through the occurrence order of the maximum value and the minimum value, a specific movement direction may be determined. According to an embodiment of the present invention, a movement from the right to the left and a movement from the left to the right in the first direction (that is, a parallel direction) are determined. Additionally, a downward movement and an upward movement in the second direction (that is, a vertical direction) are determined.

In operation S250, it is determined whether to terminate the movement recognizing process. If the sensing circuit 100 is a system capable of recognizing a repetitive movement, the movement recognition of an object is repeated again. If the sensing circuit 100 is a system incapable of recognizing a repetitive movement, the movement recognition of an object is terminated.

According to an embodiment of the present invention, a sensing circuit does not need to use a filter for removing noise. According to an embodiment of the present invention, noise and an object movement are accurately distinguished and recognized. Additionally, according to an embodiment of the present invention, in order to determine a movement direction of an object, the maximum value and minimum value of a difference value between digital signals are used. Therefore, according to an embodiment of the present invention, a movement direction of an object is recognized with reduced noise influence.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A sensing circuit for recognizing a movement, the circuit comprising:
   at least one light emitting device outputting light;
   at least one light receiving device receiving the light reflected by an object on the light emitting device and generating a plurality of current signals proportional to an amount of incident light;
   a signal conversion unit converting the plurality of current signals into a plurality of digital signals;

a recognition unit measuring a synthetic digital signal to determine whether an object moves by receiving the plurality of current signals; and a control unit controlling the recognition unit, wherein the recognition unit generates a clock signal for the synthetic digital signal greater than a critical value and measures a count generated by the clock signal; and the control unit determines whether the object moves through a comparison of the count and a reference value.

2. The circuit of claim 1, wherein the recognition unit comprises:

a signal detection unit measuring the magnitudes of the plurality of digital signals at a predetermined time interval;

a synthetic signal detection unit measuring the magnitude of the synthetic digital signal, which is the sum of the magnitudes of the plurality of digital signals, at a predetermined time interval, and if the magnitude of the synthetic digital signal is greater than the critical value, outputting the clock signal;

a counter measuring the count increased by an input of the clock signal; and a direction determination unit determining a movement direction of the object on the basis of a difference value between the plurality of digital signals.

3. The circuit of claim 2, wherein the direction determination unit determines first and second direction movements of the object by obtaining a maximum value and a minimum value of the difference value between the plurality of digital signals.

4. The circuit of claim 1, wherein when the magnitude of the synthetic digital signal is greater than the critical value, the control unit performs a control to generate the clock signal from the synthetic signal detection unit and when the magnitude of the synthetic digital signal is not greater than the critical value, the control unit performs a control not to generate the clock signal from the synthetic signal detection unit.

5. The circuit of claim 1, wherein when the count is greater than the reference value, the control unit determines that the object moves and when the count is not greater than the reference value, the control unit determines that noise occurs, thereby determining whether the object moves.

6. A movement recognizing method of a sensing circuit, the method comprising:

calculating a magnitude of a synthetic digital signal for a plurality of digital signals;

determining whether the magnitude of the synthetic digital signal is greater than a critical value;

generating a clock signal for the magnitude of the synthetic digital signal greater than the critical value on the basis of a determination result;

determining whether a count increased by the clock signal is greater than a reference value; and determining whether an object moves on the basis of the determination result and outputting a result.

7. The method of claim 6, further comprising when the magnitude of the synthetic digital signal is greater than the critical value, generating the clock signal and when the magnitude of the synthetic digital signal is not greater than the critical value, determining that there is no movement of the object and returning to converting a plurality of current signals received from at least one light receiving device into the plurality of digital signals until an output value of the synthetic digital signal becomes greater than the critical value.

8. The method of claim 6, further comprising when the count is greater than the reference value, determining that the object moves and when the count is not greater than the reference value, determining that noise occurs and initializing information on the count stored in a counter.

9. A movement recognizing method of a sensing circuit, the method comprising:

calculating difference values between a plurality of digital signals;

calculating and comparing a maximum value and a minimum value of the difference values;

determining a movement direction of an object through the comparison; and determining whether to recognize another movement of the object or whether to terminate the movement recognition of the object after the determining of the movement direction of the object.

10. The method of claim 9, wherein the calculating of the difference values between the plurality of digital signals comprises:

calculating a first direction difference value of first direction digital signals generated proportional to first direction current signals outputted from at least one light receiving device disposed in a first direction; and calculating a second direction difference value of second direction digital signals generated proportional to second direction current signals outputted from at least one light receiving device disposed in a second direction.

11. The method of claim 9, wherein the comparing of the maximum value and the minimum value comprises calculating a maximum value and a minimum value of the first direction difference value and calculating a maximum value and a minimum value of the second direction difference value.

12. The method of claim 9, wherein a difference between a maximum value and a minimum value of the first direction difference value is a first difference;

a difference between a maximum value and a minimum value of the second direction difference value is a second difference; and the determining of the movement direction of the object comprises determining first and second direction movements of the object through a comparison of the first and second differences.

* * * * *